US012697984B2

(12) United States Patent
Murazumi et al.

(10) Patent No.: US 12,697,984 B2
(45) Date of Patent: Aug. 4, 2026

(54) VEHICLE CONTROL DEVICE, VEHICLE CONTROL METHOD, AND NON-TRANSITORY COMPUTER-READABLE MEDIUM

(71) Applicants: JATCO Ltd, Fuji (JP); NISSAN MOTOR CO., LTD., Yokohama (JP)

(72) Inventors: Tarou Murazumi, Atsugi (JP); Hajime Tasaka, Ebina (JP); Keisuke Iwado, Ebina (JP); Hiroyuki Tokoi, Isehara (JP); Yuji Oishi, Sagamihara (JP)

(73) Assignees: JATCO Ltd, Fuji-shi (JP); NISSAN MOTOR CO., LTD., Fuji (JP)

( * ) Notice: Subject to any disclaimer, the term of this patent is extended or adjusted under 35 U.S.C. 154(b) by 328 days.

(21) Appl. No.: 18/548,272

(22) PCT Filed: Feb. 24, 2022

(86) PCT No.: PCT/JP2022/007484
§ 371 (c)(1),
(2) Date: Apr. 24, 2024

(87) PCT Pub. No.: WO2022/186024
PCT Pub. Date: Sep. 9, 2022

(65) Prior Publication Data
US 2025/0276704 A1      Sep. 4, 2025

(30) Foreign Application Priority Data
Mar. 5, 2021    (JP) ................................. 2021-035861

(51) Int. Cl.
B60W 50/02 (2012.01)
G07C 5/08 (2006.01)

(52) U.S. Cl.
CPC ....... B60W 50/0205 (2013.01); G07C 5/0808 (2013.01)

(58) Field of Classification Search
CPC .. B60W 50/0205; G07C 5/0808; F16H 61/12; Y02T 10/62
See application file for complete search history.

(56) References Cited

U.S. PATENT DOCUMENTS

| | | | |
|---|---|---|---|
| 9,353,692 B2 * | 5/2016 | Hideg ................... | B60W 10/08 |
| 2015/0032316 A1 | 1/2015 | Chin et al. | |
| 2020/0164856 A1 * | 5/2020 | Kamiya ................. | B60K 6/547 |

FOREIGN PATENT DOCUMENTS

| | | |
|---|---|---|
| JP | 2004-084742 A | 3/2004 |
| JP | 2017-227297 A | 12/2017 |
| WO | WO-2013/140696 A1 | 9/2013 |

* cited by examiner

*Primary Examiner* — Michael V Kerrigan
(74) *Attorney, Agent, or Firm* — Foley & Lardner LLP

(57) ABSTRACT

Provided is a vehicle control device that controls a vehicle including an automatic transmission, the automatic transmission including a first oil pump driven by a first drive source that drives a drive wheel and a second oil pump driven by a second drive source, wherein the vehicle control device drives the second oil pump when the first drive source is started, and drives the second oil pump when a time during which the second oil pump is not driven after the first drive source is started continues for a predetermined time or longer, and a drive time for the second oil pump when the first drive source is started is longer than a drive time when the time during which the second oil pump is not driven continues for the predetermined time or longer.

8 Claims, 6 Drawing Sheets

VEHICLE CONTROL DEVICE, VEHICLE CONTROL METHOD, AND NON-TRANSITORY COMPUTER-READABLE MEDIUM

TECHNICAL FIELD

The present invention relates to a vehicle control device, a vehicle control method, and a program.

BACKGROUND ART

Patent Document 1 discloses an automatic transmission control device for a hybrid vehicle that executes abnormality determination of an electric oil pump at predetermined time intervals, and determines that a failure has occurred in the electric oil pump if the number of times of occurrences of abnormality exceeds a predetermined number of times.

PRIOR ART DOCUMENT

Patent Document

Patent Document 1: WO2013/140696A1

SUMMARY OF INVENTION

However, if a state diagnosis for the electric oil pump is executed at predetermined time intervals, the electric oil pump is driven even in a state in which there is no drive request for the electric oil pump, which may give a driver a sense of discomfort. On the other hand, it is conceivable to execute the state diagnosis at a timing at which the electric oil pump is driven, but in this case, the state diagnosis cannot be executed unless there is a drive request.

The invention has been made in view of such a problem, and an object of the invention is to enable execution of a state diagnosis for an electric oil pump while reducing a sense of discomfort given to a driver.

According to one aspect of the present invention, a vehicle control device that controls a vehicle including an automatic transmission, the automatic transmission including a first oil pump driven by a first drive source that drives a drive wheel and a second oil pump driven by a second drive source, wherein the vehicle control device drives the second oil pump when the first drive source is started, and drives the second oil pump when a time during which the second oil pump is not driven after the first drive source is started continues for a predetermined time or longer, and a drive time for the second oil pump when the first drive source is started is longer than a drive time when the time during which the second oil pump is not driven continues for the predetermined time or longer.

According to other aspect of the present invention, a vehicle control device that controls a vehicle including an automatic transmission, the automatic transmission including a first oil pump driven by a first drive source that drives a drive wheel and a second oil pump driven by a second drive source, wherein the vehicle control device drives the second oil pump when the first drive source is started, and drives the second oil pump when a time during which the second oil pump is not driven after the first drive source is started continues for a predetermined time or longer, and the vehicle control device executes a state diagnosis for the second oil pump during driving for the second oil pump when the first drive source is started.

In these aspects, the state diagnosis for the second oil pump can be executed and ended during driving for the second oil pump when the first drive source is started. Further, by executing the state diagnosis for the second oil pump when the first drive source is started, it is not necessary to execute the state diagnosis for the second oil pump thereafter. Therefore, it is not necessary to lengthen the drive time for the second oil pump when the time during which the second oil pump is not driven continues for the predetermined time or longer in order to execute the state diagnosis for the second oil pump, and a sense of discomfort given to a driver when the second oil pump is driven can be reduced. Therefore, according to these aspects, the state diagnosis for the electric oil pump can be executed while reducing the sense of discomfort given to the driver.

DESCRIPTION OF EMBODIMENTS

Hereinafter, an embodiment of the invention will be described with reference to the accompanying drawings.

Figure 1:
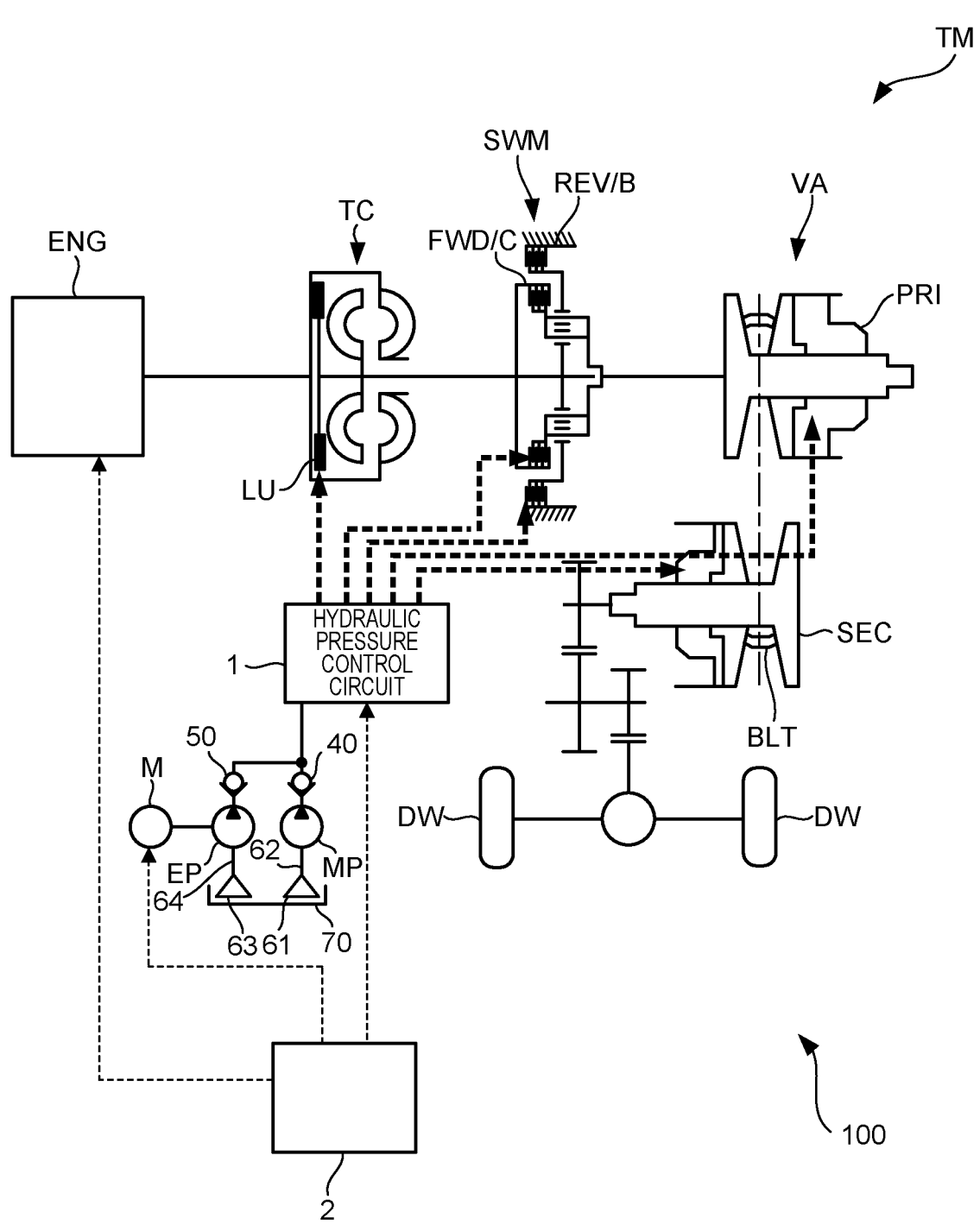
FIG. 1 is a schematic configuration diagram of a vehicle including a control device according to an embodiment of the invention.

FIG. 1 is a schematic configuration diagram of a vehicle 100. The vehicle 100 includes an engine ENG as a first drive source, a torque converter TC, a forward/reverse switching mechanism SWM, a variator VA, and a controller 2 as a control device. In the vehicle 100, an automatic transmission TM is a belt continuously variable transmission including the torque converter TC, the forward/reverse switching mechanism SWM, and the variator VA.

The engine ENG constitutes a drive source of the vehicle 100. The engine ENG is, for example, a gasoline engine or a diesel engine. Power of the engine ENG is transmitted to drive wheels DW via the torque converter TC, the forward/reverse switching mechanism SWM, and the variator VA. In other words, the torque converter TC, the forward/reverse switching mechanism SWM, and the variator VA are provided in a power transmission path connecting the engine ENG and the drive wheels DW.

The torque converter TC transmits power through a fluid. In the torque converter TC, a power transmission efficiency is enhanced by engaging a lock-up clutch LU.

The forward/reverse switching mechanism SWM is provided in a power transmission path connecting the engine ENG and the variator VA. The forward/reverse switching mechanism SWM switches forward/reverse of the vehicle 100 by switching a rotation direction of received rotation. The forward/reverse switching mechanism SWM includes a forward clutch FWD/C that is engaged when a forward (D) range is selected, and a reverse brake REV/B that is engaged when a reverse (R) range is selected. When the forward clutch FWD/C and the reverse brake REV/B are disengaged, the automatic transmission TM enters a neutral state, that is, a power transmission interrupted state.

The variator VA constitutes a belt continuously variable transmission mechanism including a primary pulley PRI, a secondary pulley SEC, and a belt BLT wound around the primary pulley PRI and the secondary pulley SEC. A primary pulley pressure, which is a hydraulic pressure of the primary pulley PRI, is supplied to the primary pulley PRI from a hydraulic pressure control circuit 1 described later, and a secondary pulley pressure, which is a hydraulic pressure of the secondary pulley SEC, is supplied to the secondary pulley SEC from the hydraulic pressure control circuit 1.

The automatic transmission TM further includes a mechanical oil pump MP as a first oil pump, an electric oil pump EP as a second oil pump, a motor M as a second drive source, a check valve 40 provided closer to a discharge port of the mechanical oil pump MP, and a check valve 50 provided closer to a discharge port of the electric oil pump EP. The mechanical oil pump MP suctions up a hydraulic oil from a reservoir (an oil pan) 70 via a strainer 61 and an oil passage 62, and pressure-feeds the hydraulic oil to the hydraulic pressure control circuit 1. The mechanical oil pump MP is driven by the power of the engine ENG. The electric oil pump EP is driven by power of the motor M. The electric oil pump EP is driven together with or independently of the mechanical oil pump MP, suctions up the hydraulic oil from the reservoir 70 via a strainer 63 and an oil passage 64, and pressure-feeds the hydraulic oil to the hydraulic pressure control circuit 1. The electric oil pump EP is auxiliary to the mechanical oil pump MP. It may be understood that the electric oil pump EP includes the motor M. The check valve 40 allows a flow of the hydraulic oil from the mechanical oil pump MP to the hydraulic pressure control circuit 1 and prevents a backflow. The check valve 50 allows a flow of the hydraulic oil from the electric oil pump EP to the hydraulic pressure control circuit 1 and prevents a backflow.

The automatic transmission TM further includes the hydraulic pressure control circuit 1. The hydraulic pressure control circuit 1 includes a plurality of flow passages and a plurality of hydraulic pressure control valves, regulates a pressure of the hydraulic oil supplied from the mechanical oil pump MP or the electric oil pump EP, and supplies the regulated hydraulic oil to each portion of the automatic transmission TM.

The controller 2 is implemented by a microcomputer including a central processing unit (CPU), a read-only memory (ROM), a random access memory (RAM), and an input/output interface (an I/O interface). The controller 2 performs various processes by reading and executing programs stored in the ROM by the CPU. The controller 2 may also be implemented by a plurality of microcomputers. Specifically, the controller 2 may also include an ATCU that controls the automatic transmission TM, an SCU that controls a shift range, an ECU that controls the engine ENG, and the like.

The controller 2 controls operations of the engine ENG, the hydraulic pressure control circuit 1, the motor M, and the like based on signals received from various sensors and the like. The hydraulic pressure control circuit 1 performs hydraulic pressure control of the lock-up clutch LU, the forward clutch FWD/C, the reverse brake REV/B, the primary pulley PRI, the secondary pulley SEC, and the like based on instructions from the controller 2.

Incidentally, in the vehicle 100, the mechanical oil pump MP and the electric oil pump EP do not operate when an ignition power is in an OFF state. Therefore, for example, when the vehicle 100 is parked in a parking lot at home for a long time, the hydraulic oil leaks out from the oil passage or the like in the automatic transmission TM.

Here, since the engine ENG is operated when the vehicle 100 travels, the mechanical oil pump MP is driven by the engine ENG, and each part is filled with the hydraulic oil. However, as described above, since the check valve 50 is provided between the electric oil pump EP and the hydraulic pressure control circuit 1, an oil passage closer to the electric oil pump EP than the check valve 50 is not filled with the hydraulic oil. Therefore, in a case in which there is a drive request for the electric oil pump EP, a delay may occur in supply of the hydraulic oil from the electric oil pump EP to the hydraulic pressure control circuit 1.

In cope with this, it is conceivable that when the engine ENG is started, the electric oil pump EP is driven and an air bleeding process in which the oil passage closer to the electric oil pump EP than the check valve 50 (an oil passage on an upstream side of the check valve 50) is filled with the hydraulic oil is executed. However, even when the air bleeding process is executed, if the electric oil pump EP continues to be in a non-driven state thereafter, the hydraulic oil leaks out from the oil passage closer to the electric oil pump EP than the check valve 50.

Therefore, the controller 2 according to the present embodiment drives the electric oil pump EP and executes the air bleeding process in which the oil passage closer to the electric oil pump EP than the check valve 50 is filled with the hydraulic oil when the engine ENG is started and when a time during which the electric oil pump EP is not driven after the engine ENG is started continues for a predetermined time or longer.

When idle stop is executed and the engine ENG is restarted, traveling is often started immediately after the engine ENG is started. Therefore, when the idle stop is executed and the engine ENG is restarted, the air bleeding process for the electric oil pump EP is not executed, unlike when the ignition power is turned ON and the engine ENG is started for the first time. That is, in the present embodiment, "the engine ENG is started" means that the engine ENG is started for the first time after the ignition power of the vehicle 100 is turned ON, and "the idle stop is executed and the engine ENG is restarted" does not include "the engine ENG is started".

Further, the controller 2 according to the present embodiment executes a state diagnosis for the electric oil pump EP by using the fact that the electric oil pump EP is driven when the air bleeding process is executed when the engine ENG is started.

Figure 2:
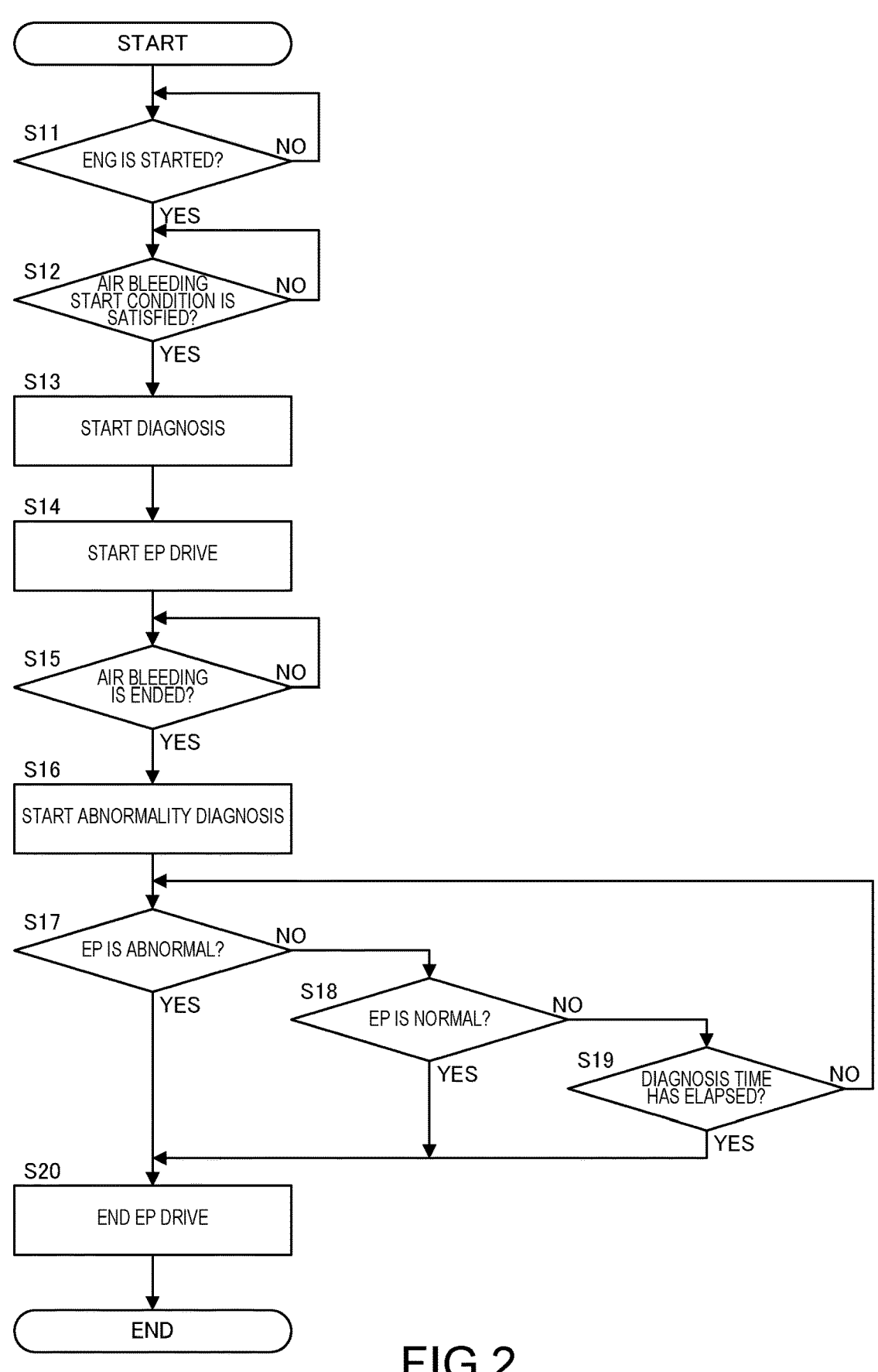
FIG. 2 is a flowchart illustrating contents of a first air bleeding process.

Hereinafter, the air bleeding process when the engine ENG is started (hereinafter, referred to as a first air bleeding process) will be described together with the state diagnosis for the electric oil pump EP. FIG. 2 is a flowchart illustrating contents of the first air bleeding process.

In step S11, the controller 2 determines whether the engine ENG is started.

If the controller 2 determines that the engine ENG is started, the process proceeds to step S12. If the controller 2 determines that the engine ENG is not started, the process in step S11 is repeated.

In step S12, the controller 2 determines whether an air bleeding start condition is satisfied.

If the controller 2 determines that the air bleeding start condition is satisfied, the process proceeds to step S13. If the controller 2 determines that the air bleeding start condition is not satisfied, the process in step S12 is repeated.

In step S13, the controller 2 starts the state diagnosis for the electric oil pump EP. Specifically, the controller 2 starts a normality diagnosis and a part of an abnormality diagnosis in the state diagnosis for the electric oil pump EP.

In step S14, the controller 2 controls the motor M to drive the electric oil pump EP. Specifically, the controller 2 controls the motor M based on a higher one of an instruction rotation speed of the electric oil pump EP in the first air bleeding process (a first instruction rotation speed TNp1) and an instruction rotation speed of the electric oil pump EP in the state diagnosis for the electric oil pump EP (a second instruction rotation speed TNp2). The first instruction rotation speed TNp1 and the second instruction rotation speed TNp2 are set in advance based on various specifications of the vehicle 100 and experimental results. The first instruction rotation speed TNp1 and the second instruction rotation speed TNp2 may be corrected based on an oil temperature or the like. Hereinafter, the instruction rotation speed that is finally used to control the motor M is referred to as a control instruction rotation speed TNpc.

In step S15, the controller 2 determines whether the air bleeding is ended. Specifically, the controller 2 determines that the air bleeding is ended if the number of rotations from start of driving for the electric oil pump EP is equal to or greater than a predetermined number of rotations.

The number of rotations of the electric oil pump EP required to fill the oil passage closer to the electric oil pump EP than the check valve 50 with the hydraulic oil is determined in design. That is, the predetermined number of rotations is set to a value at which the oil passage closer to the electric oil pump EP than the check valve 50 is filled with the hydraulic oil if the number of rotations of the electric oil pump EP is equal to or greater than the predetermined number of rotations. In the present embodiment, the predetermined number of rotations is set in advance such that the hydraulic oil is filled in a space above an oil surface in the strainer 63 that suctions up the hydraulic oil from the oil passage 64 and the reservoir 70 on an upstream side of the electric oil pump EP. The predetermined number of rotations is about 30 to 40 in a general vehicle. Further, a time from the start of the driving for the electric oil pump EP to the end of the air bleeding is about 1 [sec].

If the controller 2 determines that the air bleeding is ended, the process proceeds to step S16. If the controller 2 determines that the air bleeding is not ended, the process in step S15 is repeated.

In step S16, the controller 2 starts the abnormality diagnosis in the state diagnosis for the electric oil pump EP. Specifically, the controller 2 starts the abnormality diagnosis other than the abnormality diagnosis started in step S13. After step S16, the controller 2 controls the motor M based on the second instruction rotation speed TNp2. That is, after step S16, the second instruction rotation speed TNp2 is the control instruction rotation speed TNpc.

In step S17, the controller 2 determines whether the electric oil pump EP is abnormal. For example, the controller 2 determines that the electric oil pump EP is abnormal if any one of the following condition (a) or (b) is satisfied.

(a) A state in which a differential rotation between an actual rotation speed Np of the electric oil pump EP and the control instruction rotation speed TNpc is greater than a predetermined value continues for a predetermined determination time or longer.
  (b) A state in which a current consumption value Im of the motor M is less than a predetermined current value Is continues for a predetermined determination time or longer.

A reason why the abnormality diagnosis for the electric oil pump EP is divided into a case of the condition (a) in which the abnormality diagnosis is started if the air bleeding start condition is satisfied (step S12) and a case of the condition (b) in which the abnormality diagnosis is started if the air bleeding is ended (step S15) is to quickly determine an abnormality for the condition (a) and to prevent erroneous determination for the condition (b).

If the controller 2 determines that the electric oil pump EP is abnormal, the process proceeds to step S20. If the controller 2 determines that the electric oil pump EP is not abnormal, the process proceeds to step S18.

In step S20, the controller 2 controls the motor M to stop the electric oil pump EP.

In step S18, the controller 2 determines whether the electric oil pump EP is normal. For example, the controller 2 determines that the electric oil pump EP is normal if the following conditions (c) and (d) are both satisfied.

(c) A state in which the differential rotation between the actual rotation speed Np of the electric oil pump EP and the control instruction rotation speed TNpc is equal to or less than a predetermined value continues for a predetermined determination time or longer.
  (d) A state in which the current consumption value Im of the motor M is equal to or greater than a predetermined current value Is continues for a predetermined determination time or longer.

The predetermined values in the conditions (a) and (c) are set in advance based on various specifications of the vehicle 100 and experimental results. The predetermined values are, for example, several tens to several hundreds [rpm], and are the same value. Further, the predetermined determination times in the conditions (a) to (d) are set in advance based on various specifications of the vehicle 100 and experimental results. The predetermined determination times are, for example, 1 to 2 [sec], and may all be the same time or different times.

If the controller 2 determines that the electric oil pump EP is normal, the process proceeds to step S20. If the controller 2 determines that the electric oil pump EP is not normal, the process proceeds to step S19.

In step S19, the controller 2 determines whether a predetermined diagnosis time has elapsed after the air bleeding is ended (step S15).

If the controller 2 determines that the predetermined diagnosis time has elapsed after the air bleeding is ended, the process proceeds to step S20. If the controller 2 determines that the predetermined diagnosis time has not elapsed after the air bleeding is ended, the process returns to step S17.

If the electric oil pump EP is driven for a long time in a state in which neither normality determination nor abnormality determination is determined, it may give a driver a sense of discomfort. Therefore, when the predetermined diagnosis time has elapsed after the air bleeding is ended, the controller 2 interrupts the state diagnosis and stops the electric oil pump EP. The predetermined diagnosis time is, for example, 3 to 5 [sec].

Figure 3:
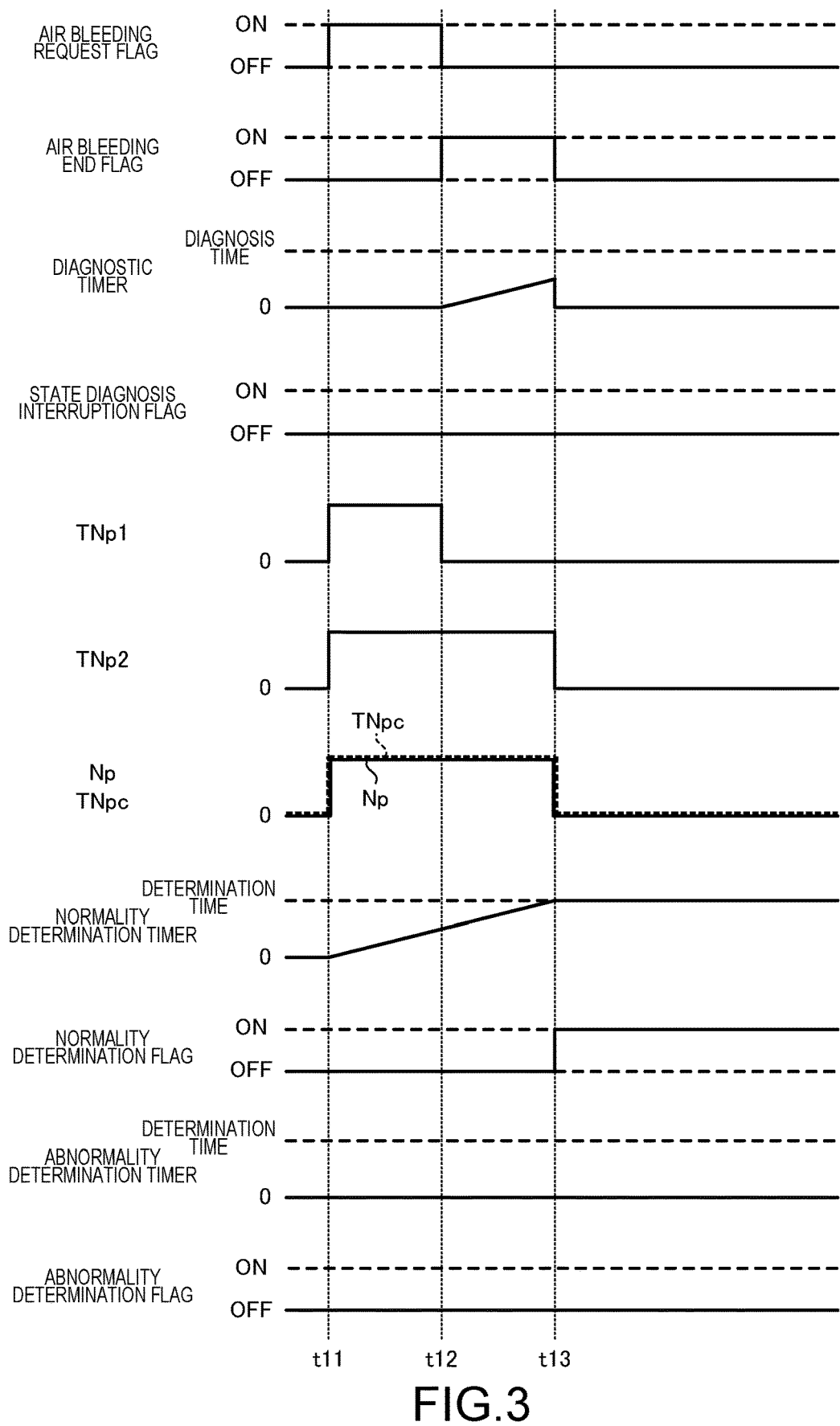
FIG. 3 is a time chart illustrating a state in which an electric oil pump is determined to be normal.
Figure 4:
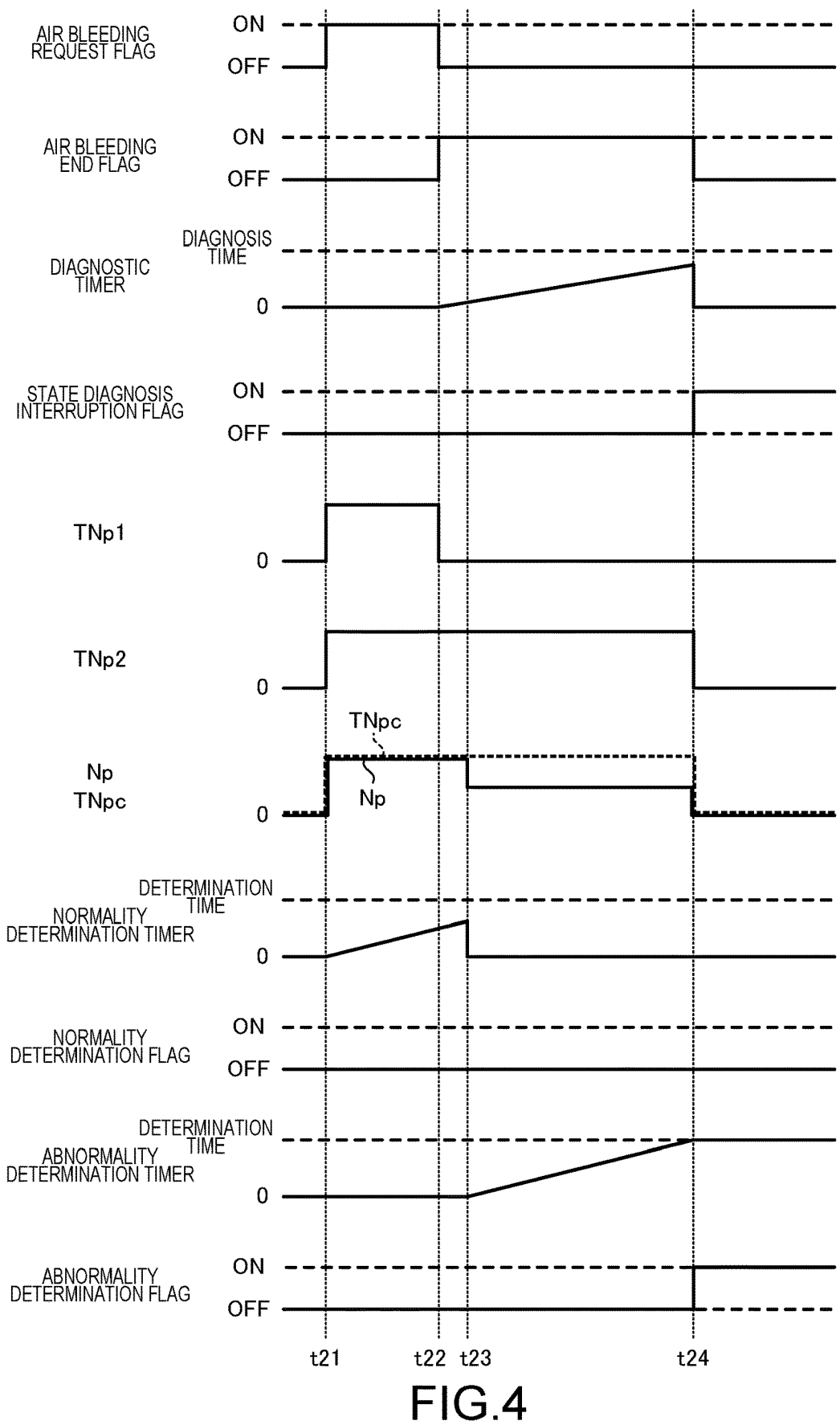
FIG. 4 is a time chart illustrating a state in which the electric oil pump is determined to be abnormal.
Figure 5:
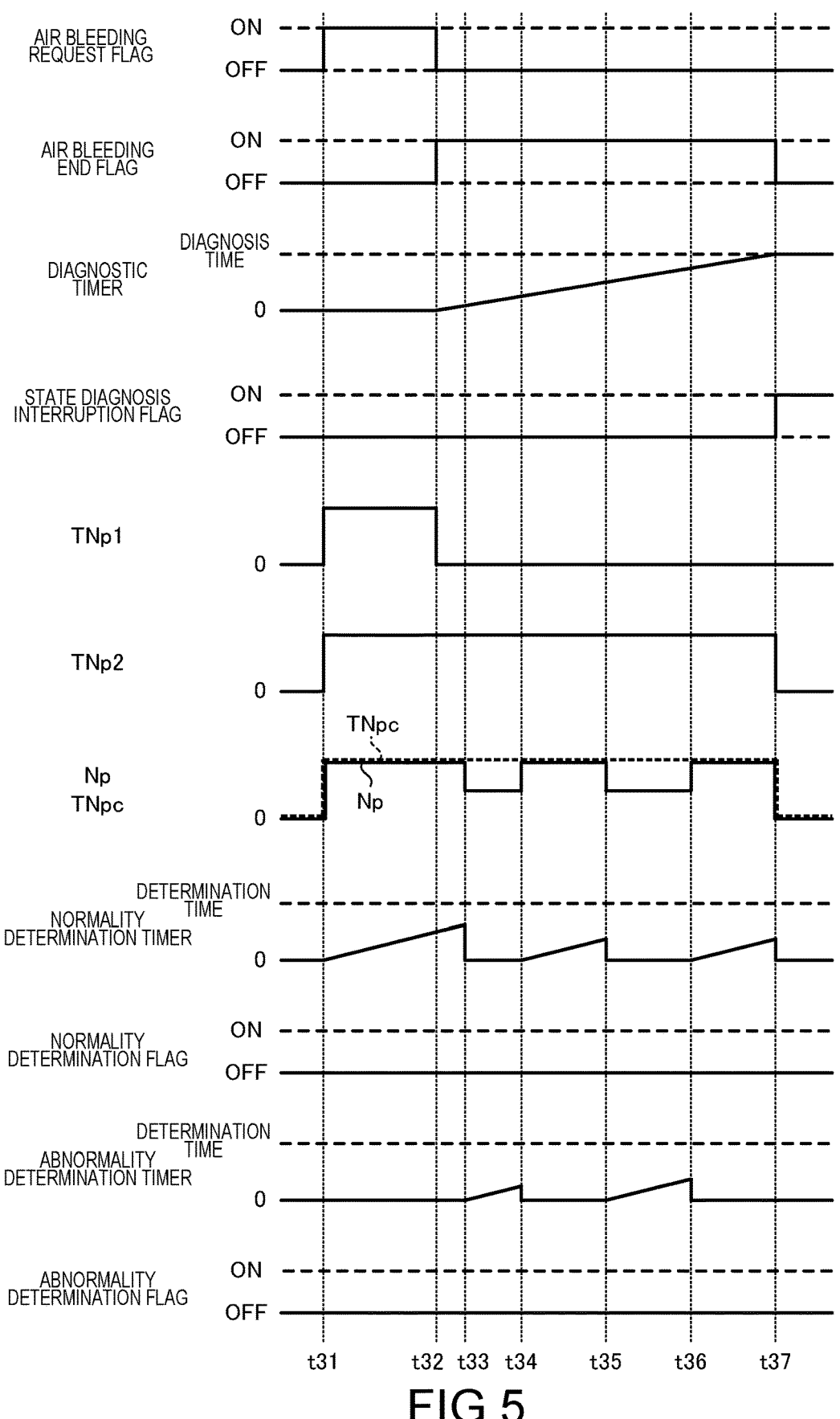
FIG. 5 is a time chart illustrating a state in which a state diagnosis for the electric oil pump is interrupted.

Next, the state diagnosis for the electric oil pump EP will be described in detail with reference to FIG. 3 to FIG. 5. FIG. 3 is a time chart illustrating a state in which the electric oil pump EP is determined to be normal. FIG. 4 is a time chart illustrating a state in which the electric oil pump EP is determined to be abnormal. FIG. 5 is a time chart illustrating a state in which the state diagnosis for the electric oil pump EP is interrupted. FIG. 3 to FIG. 5 illustrate a case in which the state diagnosis for the electric oil pump EP is executed based on the differential rotation between the actual rotation speed Np and the control instruction rotation speed TNpc.

First, a state in which the electric oil pump EP is determined to be normal will be described with reference to FIG. 3.

If the air bleeding start condition is satisfied at a time point t11, an air bleeding request flag is turned ON, and the first instruction rotation speed TNp1 increases. Further, the normality diagnosis is started, and the second instruction rotation speed TNp2 increases.

Accordingly, the motor M is controlled based on the higher one (the control instruction rotation speed TNpc) of the first instruction rotation speed TNp1 and the second instruction rotation speed TNp2, and the actual rotation speed Np of the electric oil pump EP increases. In FIG. 3 to FIG. 5, the first instruction rotation speed TNp1 and the second instruction rotation speed TNp2 are the same value.

Further, when the differential rotation between the actual rotation speed Np and the control instruction rotation speed TNpc is equal to or less than the predetermined value, a normality determination timer starts counting.

When the air bleeding is ended at a time point t12, the air bleeding request flag is turned OFF and the first instruction rotation speed TNp1 is zero. Therefore, thereafter, the second instruction rotation speed TNp2 is the control instruction rotation speed TNpc.

Further, when the air bleeding request flag is turned OFF, an air bleeding end flag is turned ON. When the air bleeding end flag is turned ON, a diagnostic timer starts counting.

When the normality determination timer reaches the predetermined determination time at a time point t13, a normality determination flag is turned ON. Accordingly, the normality is determined to be affirmative. The normality determination flag is maintained until the ignition power is turned OFF.

Further, when the normality is determined to be affirmative, the air bleeding end flag is turned OFF, the diagnostic timer is reset, the second instruction rotation speed TNp2 is zero, and the actual rotation speed Np is zero.

Next, a state in which the electric oil pump EP is determined to be abnormal will be described with reference to FIG. 4. The state up to a time point t22 is the same as the state up to the time point t12 in FIG. 2, and thus the description thereof is omitted.

When the differential rotation between the actual rotation speed Np and the control instruction rotation speed TNpc at a time point t23 is greater than the predetermined value, the normality determination timer is reset and an abnormality determination timer starts counting.

When the abnormality determination timer reaches the predetermined determination time at a time point t24, the abnormality determination flag is turned ON. Accordingly, the abnormality is determined to be affirmative. The abnormality determination flag is maintained until the ignition power is turned OFF.

Further, when the abnormality is determined to be affirmative, the air bleeding end flag is turned OFF, the diagnostic timer is reset, the second instruction rotation speed TNp2 is zero, and the actual rotation speed Np is zero.

Next, a state in which the state diagnosis of the electric oil pump EP is interrupted will be described with reference to FIG. 5. The state up to a time point t33 is the same as the state up to the time point t23 in FIG. 4, and thus the description thereof is omitted.

When the differential rotation between the actual rotation speed Np and the control instruction rotation speed TNpc at a time point t34 is equal to or less than the predetermined value, the abnormality determination timer is reset and the normality determination timer starts counting.

In the example in FIG. 5, the actual rotation speed Np is not stabilized thereafter, the normality determination timer is reset and the abnormality determination timer starts counting at a time point t35, and the abnormality determination timer is reset and the normality determination timer starts counting at a time point t36.

When the diagnostic timer reaches the predetermined diagnosis time at a time point t37, a state diagnosis interruption flag is turned ON. Accordingly, the state diagnosis is interrupted. The state diagnosis interruption flag is maintained until the ignition power is turned OFF.

Further, when the state diagnosis is interrupted, the air bleeding end flag is turned OFF, the second instruction rotation speed TNp2 is zero, and the actual rotation speed Np is zero. Further, the counting of the normality determination timer is reset. If the abnormality determination timer is counting at a timing at which the state diagnosis is interrupted, the counting of the abnormality determination timer is reset.

Figure 6:
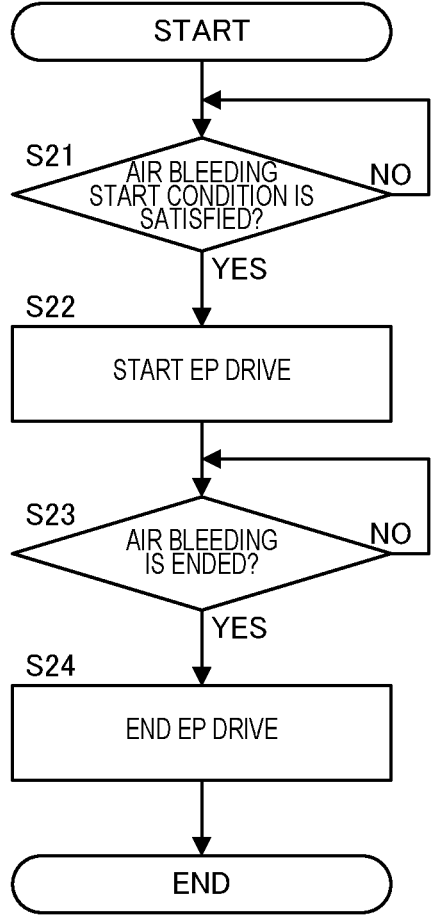
FIG. 6 is a flowchart illustrating contents of a second air bleeding process.

Subsequently, an air bleeding process when the electric oil pump EP is not driven for a predetermined time or longer after the engine ENG is started (hereinafter, referred to as a second air bleeding process) will be described with reference to FIG. 6. FIG. 6 is a flowchart illustrating contents of the second air bleeding process.

In step S21, the controller 2 determines whether the air bleeding start condition is satisfied. Specifically, the controller 2 determines that the air bleeding start condition is satisfied if the electric oil pump EP is not driven for a predetermined time or longer after the engine ENG is started. The predetermined time is, for example, several tens [min].

If the controller 2 determines that the air bleeding start condition is satisfied, the process proceeds to step S22. If the controller 2 determines that the air bleeding start condition is not satisfied, the process in step S21 is repeated.

In step S22, the controller 2 controls the motor M to drive the electric oil pump EP. Specifically, the controller 2 controls the motor M based on an instruction rotation speed (a third instruction rotation speed TNp3) of the electric oil pump EP in the second air bleeding process. The third instruction rotation speed TNp3 is set in advance based on various specifications of the vehicle 100 and experimental results. The third instruction rotation speed TNp3 may be corrected based on an oil temperature or the like.

In step S23, the controller 2 determines whether the air bleeding is ended. Specific process contents in step S23 are the same as that in step S15 of the first air bleeding process illustrated in FIG. 2.

If the controller 2 determines that the air bleeding is ended, the process proceeds to step S24. If the controller 2 determines that the air bleeding is not ended, the process in step S23 is repeated.

In step S24, the controller 2 controls the motor M to stop the electric oil pump EP.

In this way, in the second air bleeding process, when the air bleeding is ended, the electric oil pump EP is promptly stopped.

In the first air bleeding process, the state diagnosis for the electric oil pump EP is also executed, so that a drive time for the electric oil pump EP is lengthened until the state diagnosis is ended. In other words, in the first air bleeding process, the state diagnosis for the electric oil pump EP can be executed and ended during the driving for the electric oil pump EP by lengthening the drive time for the electric oil pump EP.

On the other hand, in the second air bleeding process, since it is not necessary to execute the state diagnosis for the electric oil pump EP, the drive time for the electric oil pump EP can be shortened compared with that in the first air bleeding process. Therefore, by driving the electric oil pump EP in a state in which there is no drive request, the sense of discomfort given to the driver can be reduced.

The drive time for the electric oil pump EP will be described in more detail. The first instruction rotation speed TNp1, the second instruction rotation speed TNp2, and the third instruction rotation speed TNp3 are set such that the shortest drive time for the electric oil pump EP in the first air bleeding process is longer than the drive time for the electric oil pump EP in the second air bleeding process. The shortest drive time for the electric oil pump EP in the first air bleeding process is a drive time for the electric oil pump EP in a case in which the electric oil pump EP is determined to be normal in a shortest time. However, when the shift range is changed from a non-travel range (for example, a parking (P) range) to a travel range (for example, a D range) by a shift operation or the like of the driver, in order to respond to a travel request of the driver, the air bleeding process or the state diagnosis is interrupted, and the shift range is controlled. Therefore, the drive time may be shorter than the shortest drive time for the electric oil pump EP in the first air bleeding process.

Main functions and effects of the controller 2 configured as described above will be collectively described.

(1)(2)(3)(5)(7) The controller 2 controls the vehicle 100 including the automatic transmission TM. The automatic transmission TM includes the mechanical oil pump MP driven by the first drive source that drives the drive wheels DW and the electric oil pump EP driven by the second drive source. The controller 2 drives the electric oil pump EP when the first drive source is started, and drives when the time during which the electric oil pump EP is not driven after the first drive source is started continues for a predetermined time or longer. The drive time for the electric oil pump EP when the first drive source is started is longer than the drive time when the time during which the electric oil pump EP is not driven continues for the predetermined time or longer. In the present embodiment, the first drive source is the engine ENG. Further, the second drive source is the motor M.

Accordingly, the drive time for the electric oil pump EP when the first drive source is started is longer than the drive time when the electric oil pump EP is not driven for the predetermined time or longer. Therefore, the state diagnosis for the electric oil pump EP can be executed and ended during the driving for the electric oil pump EP when the first drive source is started. Further, by executing the state diagnosis for the electric oil pump EP when the first drive source is started, it is not necessary to execute the state diagnosis for the electric oil pump EP thereafter. Therefore, it is not necessary to lengthen the drive time for the electric oil pump EP when the time during which the electric oil pump EP is not driven continues for the predetermined time or longer in order to execute the state diagnosis for the electric oil pump EP, and the sense of discomfort given to the driver when the electric oil pump EP is driven can be reduced. Therefore, according to this, the state diagnosis for the electric oil pump EP can be executed while reducing the sense of discomfort given to the driver.

(4)(6)(8) The controller 2 executes the state diagnosis for the electric oil pump EP during the driving for the electric oil pump EP when the first drive source is started.

Accordingly, the state diagnosis for the electric oil pump EP can be executed and ended during the driving for the electric oil pump EP when the first drive source is started. Further, by executing the state diagnosis for the electric oil pump EP when the first drive source is started, it is not necessary to execute the state diagnosis for the electric oil pump EP thereafter. Therefore, it is not necessary to lengthen the drive time for the electric oil pump EP when the time during which the electric oil pump EP is not driven after the first drive source is started continues for the predetermined time or longer in order to execute the state diagnosis for the electric oil pump EP, and the sense of discomfort given to the driver when the electric oil pump EP is driven can be reduced.

While an embodiment of the invention has been described, the embodiment is merely one of application examples of the invention, and does not intend to limit a technical scope of the invention to a specific configuration according to the embodiment.

For example, in the above embodiment, the case in which the check valve 50 is provided closer to the discharge port of the electric oil pump EP has been described. However, the check valve 50 may be provided closer to the reservoir 70 than the electric oil pump EP.

Further, in the above embodiment, the case in which the controller 2 controls the motor M based on the higher one of the instruction rotation speed of the electric oil pump EP in the first air bleeding process (the first instruction rotation speed TNp1) and the instruction rotation speed of the electric oil pump EP in the state diagnosis of the electric oil pump EP (the second instruction rotation speed TNp2) has been described. However, when the controller 2 determines that the air bleeding is ended and starts the abnormality diagnosis for the electric oil pump EP, the controller 2 may continue using the instruction rotation speed of the electric oil pump EP in the first air bleeding process (the first instruction rotation speed TNp1). Accordingly, since the air bleeding process and the state diagnosis can be executed at the same rotation speed, the sense of discomfort given to the driver can be reduced.

Various programs executed by the controller 2 may be stored in a non-transitory recording medium such as a CD-ROM.

DESCRIPTION OF REFERENCE SIGNS 100 vehicle
2 controller (control device, computer)
TM automatic transmission
ENG engine (first drive source)
MP mechanical oil pump (first oil pump)
EP electric oil pump (second oil pump)
M motor (second drive source)
DW drive wheel The present application claims a priority of Japanese Patent Application No. 2021-035861 filed with the Japan Patent Office on Mar. 5, 2021, all the contents of which are hereby incorporated by reference.

The invention claimed is:

1. A vehicle control device that controls a vehicle including an automatic transmission, the automatic transmission including a first oil pump driven by a first drive source that drives a drive wheel and a second oil pump driven by a second drive source, wherein the vehicle control device drives the second oil pump when the first drive source is started, and drives the second oil pump when a time during which the second oil pump is not driven after the first drive source is started continues for a predetermined time or longer, and a drive time for the second oil pump when the first drive source is started is longer than a drive time when the time during which the second oil pump is not driven continues for the predetermined time or longer.

2. The vehicle control device according to claim 1, wherein the first drive source is an engine.

3. The vehicle control device according to claim 1, wherein the second drive source is a motor.

4. The vehicle control device according to claim 1, wherein the vehicle control device executes a state diagnosis for the second oil pump during driving for the second oil pump when the first drive source is started.

5. A vehicle control method that controls a vehicle including an automatic transmission, the automatic transmission including a first oil pump driven by a first drive source that drives a drive wheel and a second oil pump driven by a second drive source, the control method comprising:

driving the second oil pump when the first drive source is started, and driving the second oil pump when a time during which the second oil pump is not driven after the first drive source is started continues for a predetermined time or longer, wherein a drive time for the second oil pump when the first drive source is started is longer than a drive time when the time during which the second oil pump is not driven continues for the predetermined time or longer.

6. The vehicle control method according to claim 5, wherein executing a state diagnosis for the second oil pump during driving for the second oil pump when the first drive source is started.

7. A non-transitory computer-readable medium storing a program executable by a computer in a vehicle including an automatic transmission, the automatic transmission including a first oil pump driven by a first drive source that drives a drive wheel and a second oil pump driven by a second drive source, the program causing the computer to execute:

a procedure of driving the second oil pump when the first drive source is started, and a procedure of driving the second oil pump when a time during which the second oil pump is not driven after the first drive source is started continues for a predetermined time or longer, wherein a drive time for the second oil pump when the first drive source is started is longer than a drive time when the time during which the second oil pump is not driven continues for the predetermined time or longer.

8. The non-transitory computer-readable medium according to claim 7, wherein the program causing the computer to execute:

a procedure of executing a state diagnosis for the second oil pump during driving for the second oil pump when the first drive source is started.

* * * * *